Oct. 28, 1958   C. MacGREGOR   2,858,122
CONVEYING APPARATUS
Filed March 3, 1955   11 Sheets-Sheet 1

INVENTOR.
Charles MacGregor
BY
HIS ATTORNEYS

Oct. 28, 1958   C. MacGREGOR   2,858,122
CONVEYING APPARATUS
Filed March 3, 1955   11 Sheets-Sheet 2

INVENTOR.
Charles MacGregor
BY
*Webb, Mackey & Burden*
HIS ATTORNEYS

Oct. 28, 1958  C. MacGREGOR  2,858,122
CONVEYING APPARATUS
Filed March 3, 1955  11 Sheets-Sheet 3
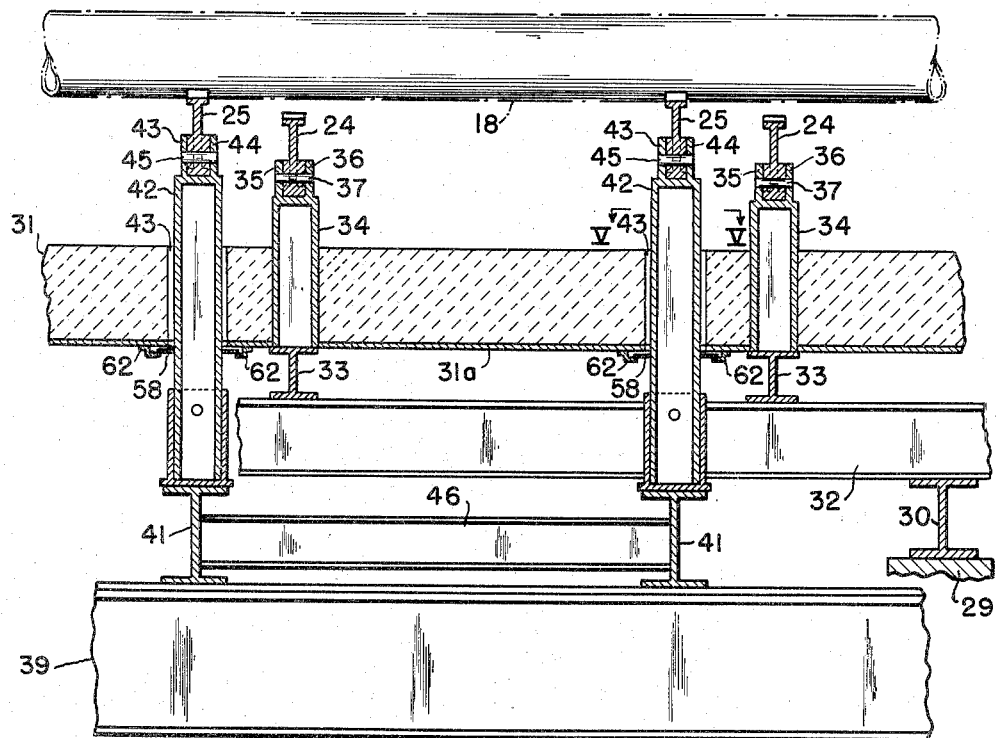
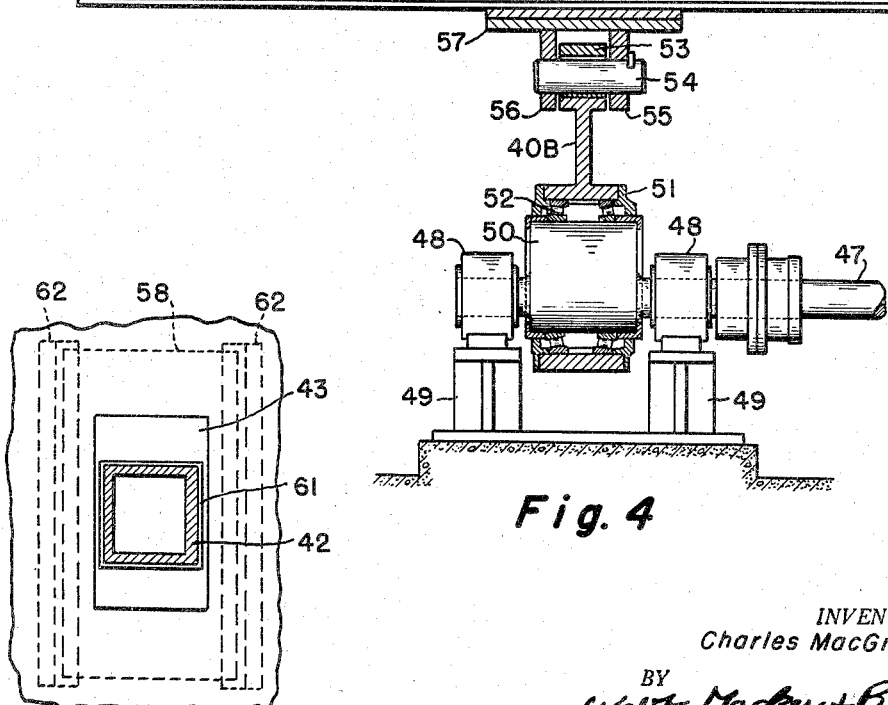
Fig. 4
Fig. 5
INVENTOR.
Charles MacGregor
BY
HIS ATTORNEYS

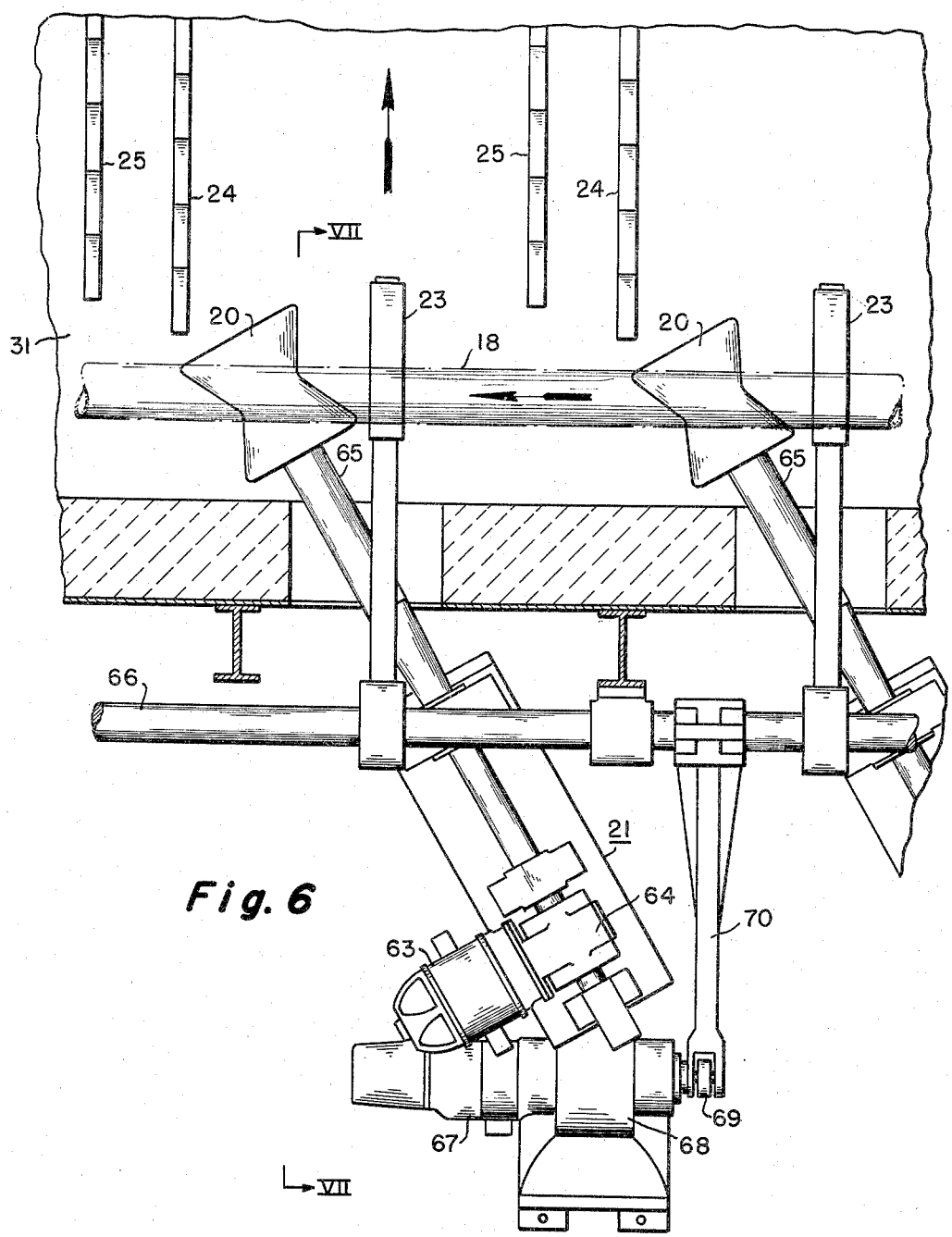

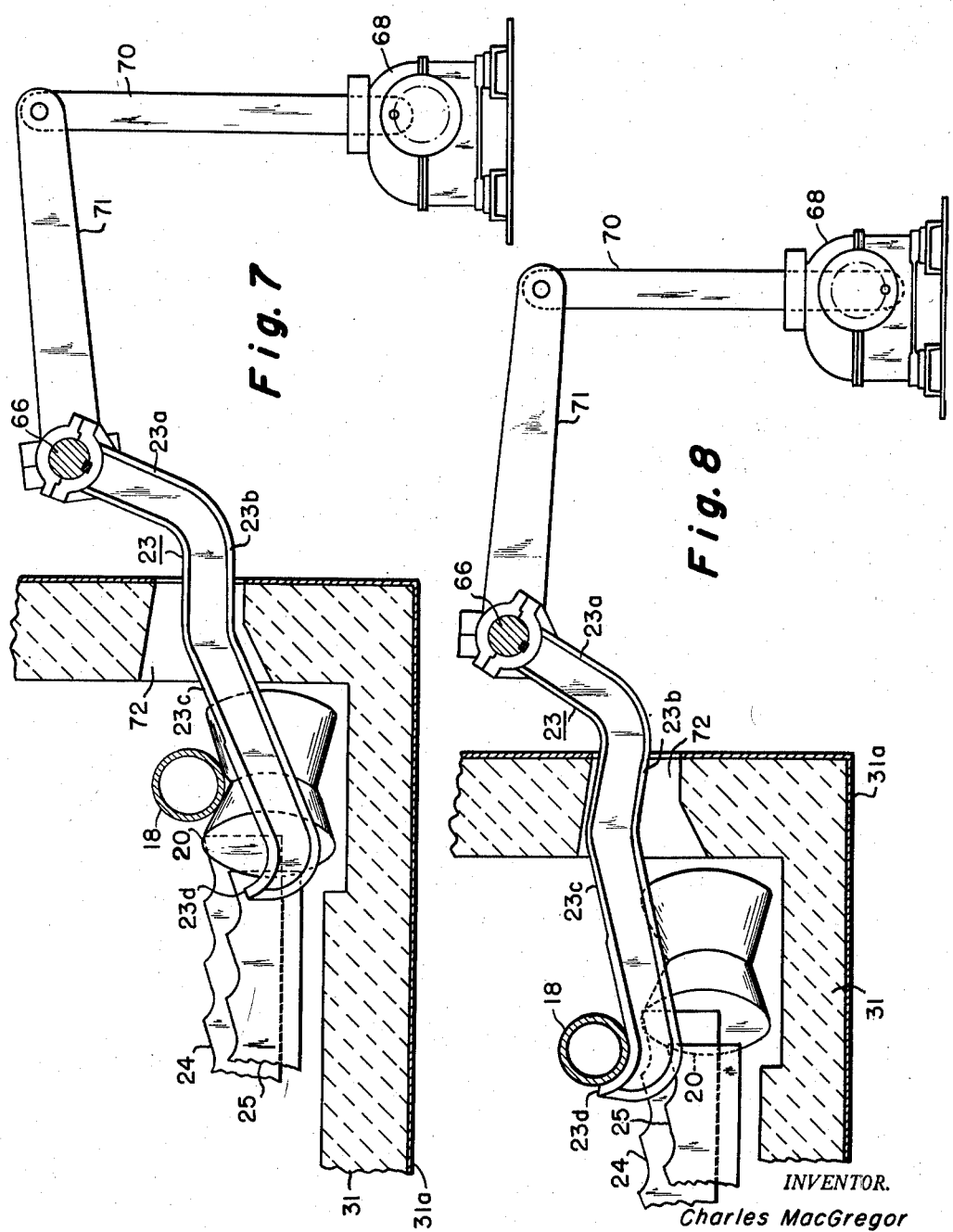

Oct. 28, 1958

C. MacGREGOR 2,858,122

CONVEYING APPARATUS

Filed March 3, 1955

INVENTOR.
Charles MacGregor
BY
Webb Mackey + Burden
HIS ATTORNEYS

Oct. 28, 1958  C. MacGREGOR  2,858,122
CONVEYING APPARATUS
Filed March 3, 1955  11 Sheets-Sheet 9

INVENTOR.
Charles MacGregor
BY
HIS ATTORNEYS

Oct. 28, 1958  C. MacGREGOR  2,858,122
CONVEYING APPARATUS

Filed March 3, 1955  11 Sheets-Sheet 10

INVENTOR.
Charles MacGregor
BY
HIS ATTORNEYS

Oct. 28, 1958     C. MacGREGOR     2,858,122
CONVEYING APPARATUS

Filed March 3, 1955     11 Sheets-Sheet 11

INVENTOR.
Charles MacGregor
BY
HIS ATTORNEYS

United States Patent Office 2,858,122
Patented Oct. 28, 1958

2,858,122
CONVEYING APPARATUS

Charles MacGregor, Pittsburgh, Pa., assignor, by mesne assignments, to York Engineering & Construction Company, Pittsburgh, Pa., a corporation of Pennsylvania Application March 3, 1955, Serial No. 491,973

10 Claims. (Cl. 263—6)

This application relates to conveying apparatus, more particularly to a conveying table for moving workpieces to be heated through a continuous heating furnace. Such workpieces can be, for example, steel tubes, bars, billets, and the like.

In heating such articles as tubes, rods, bars, etc. for heat-treating purposes or for bringing them to proper temperatures for subsequent operations, it is very important that the workpieces be uniformly heated throughout. Aside from metallurigcal requirements, various mechanical difficulties develop if the work is not heated uniformly; for example, a tube being heated as it moves through a furnace will warp or camber if one part is heated to a higher temperature than another part.

Heretofore, extreme difficulty has been encountered in obtaining uniform heating of tubes, bars, etc., particularly when they are being heated in a continuous-type furnace in which the workpieces are fed, one at a time, into one end of a furnace, moved transversely across the furnace, and withdrawn, one at a time, from another end after being brought to the correct temperature.

It is not possible to maintain a uniform temperature throughout a continuous furnace. For example, temperatures adjacent the hearth are nearly always different from temperatures adjacent the roof. Therefore, unless the work being heated is rotated, one portion of the work will be heated more than another portion. Rotating the work has heretofore been a difficult operation and never satisfactorily done, one reason being that equipment for rotating the work created large openings in the hearth which permitted large drafts of cold air to enter the furnace through the hearth, making it difficult or impossible to control the furnace temperatures and creating cold spots on the portions of the work above the openings in the hearth.

It has been proposed to feed the workpieces through furnaces axially, one piece at a time, as in U. S. Patent No. 2,592,236. Such a furnace has only a limited capacity since only one piece at a time is heated in the furnace whereas, in an actual furnace installation equipped with my conveying apparatus, as many as 60 tubes or more can be heated at one time, although the tubes are fed into the furnace and withdrawn from the furnace one at a time.

It has also been proposed to move several workpieces at a time axially through a furnace, such structures being shown in Fahrenwald Patent No. 1,872,713 and Frank et al. Patent No. 1,834,304. The difficulty with this type of furnace is that more than one workpiece is delivered from the furnace at a time, and also, the workpieces are not all delivered at one position from the furnace so that they can all move directly to a machine for further processing.

I have invented conveying apparatus for moving workpieces to be heated through a furnace which can readily be adapted to any conventional type of furnace, which is relatively simple in construction, and which permits a substantially airtight furnace hearth. The speed of my conveying apparatus can readily be adjusted to control the time during which the work is heated and it can handle a wide variety of sizes and shapes.

In the accompanying drawings, I have illustrated certain present preferred embodiments of my invention, in which:

Figure 4 is an enlarged view of a portion of Figure 2;

Figure 5 is a section along the lines V—V of Figure 4;

Figure 6 is a horizontal section of a portion of the entry side of a furnace having my conveying apparatus;

Figure 7 is a section along the lines VII—VII of Figure 6;

Figure 8 is a view similar to Figure 7, but showing the operating parts in a different operating position;

Figures 10 to 13, inclusive, are schematic diagrams showing one operation of my conveying apparatus when circular workpieces are moved through the furnace;

Figures 14 to 19 inclusive, are schematic diagrams showing another way in which my apparatus can be operated to move circular workpieces through the furnace; and Figures 20 to 25, inclusive, are schematic diagrams showing the operation of my conveying apparatus when rectangular workpieces are moved through the furnace.

My conveying apparatus is particularly adapted for the heat treatment of steel tubing, especially tubing intended for deep wells. Therefore, it will be described with particular reference primarily thereto, although it is to be understood that workpieces having a variety of shapes can be handled by my conveying apparatus.

Figure 1:
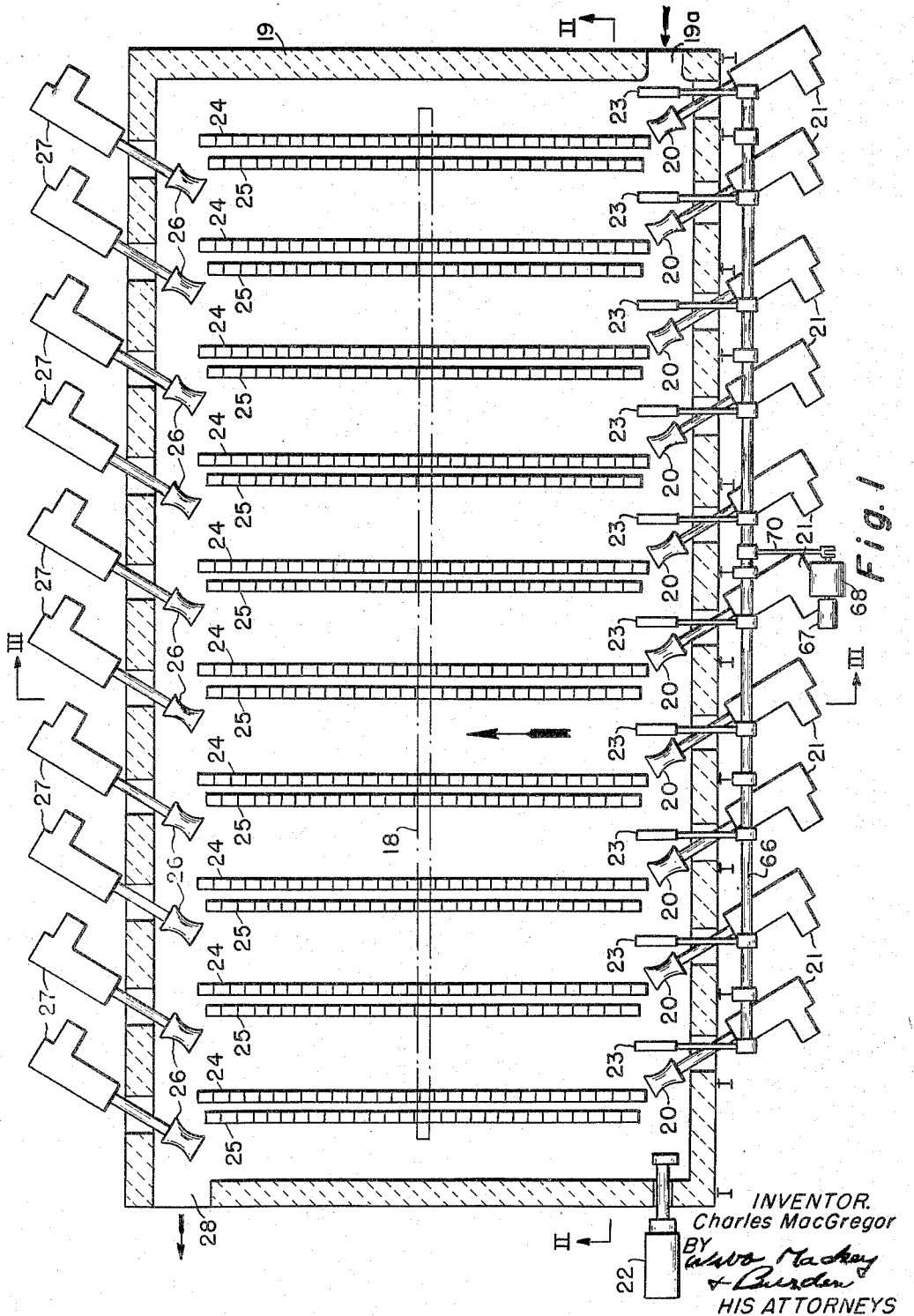
Figure 1 is a horizontal section through a conventional continuous furnace in which my conveying apparatus has been installed.

Referring to Figure 1, tubes 18 are brought to a furnace 19 and fed through an entry port 19a onto conventional skewed rollers 20, each driven by a drive 21. The rollers 20 carry the tube along one side of the furnace to the end of the furnace, where it engages a bumper 22. The rollers 20 not only advance the tube along the side of the furnace, but they also rotate it about its axis. This rotation keeps the tube straight and also takes out camber which developed in the tube before it was brought to the furnace.

Kickups 23 lift the tube off the rollers 20 and place it on stationary racks 24 which extend parallel to each other and across the furnace above the furnace hearth. Movable racks 25, parallel to and adjacent to the racks 24, are then actuated to raise the tubes up off the stationary racks 24 and deposit them back on the stationary racks at a point closer to the other side of the furnace. As will be later explained, the tubes while moving across the racks are also rotated about their own axes. This action continues until the tube has been moved the full width of the furnace, where it rolls off the ends of the stationary racks onto another set of skewed rollers 26, driven by drives 27, out through an exit port 28 in the end of the furnace opposite to the entry port. The rollers 26 also rotate the tubes about their axes. In the operation of my conveying apparatus, the racks are filled to capacity with pipe sections, so that, when a tube enters the entrance port 19a, another tube leaves the exit port 28. The speed of operation can be varied to regulate the heating time for the particular size of workpiece being heated.

Figure 2:
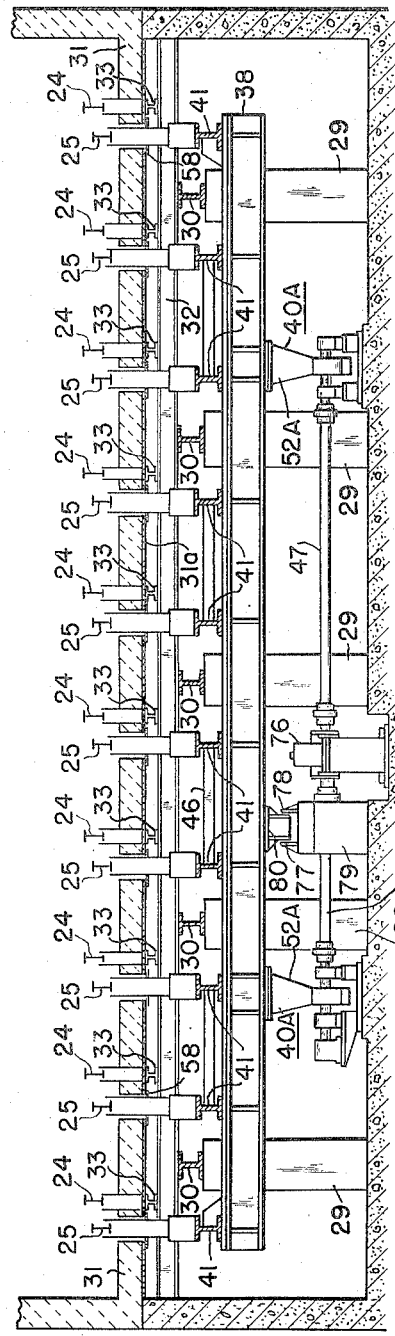
Figure 2 is a section along the lines II—II of Figure 1.
Figure 3:
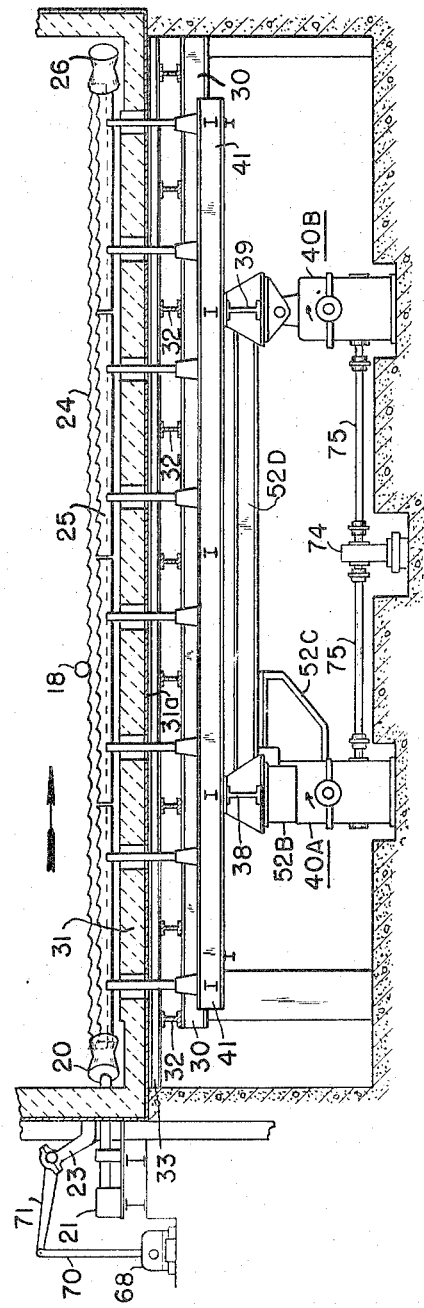
Figure 3 is a section along the lines III—III of Figure 1.

Figures 2 and 3 show the construction of the supports for the stationary racks 24 and the movable racks 25. The configuration of the top surfaces of the racks which support the tubes and which cause the tubes to rotate about their axes as they move through the furnace will be later discussed. Posts 29 support I beams 30 which extend across the furnace below the hearth 31 and support cross beams 32 which extend the length of the furnace and, in turn, support stringer beams 33, one of which is directly beneath and supports each stationary rack 24. The stringer beams 33 also support the base plate 31a for the hearth. As shown in Figure 4, pedestals 34 extend upwardly through the hearth 31 at intervals along the stringer beams 33 and have, at their top surfaces, yokes formed of two flanges 35 and 36, in which the racks 24 are carried. Pins 37 secure the racks 24 in the yokes.

Referring to Figures 2 and 3, two main beams 38 and 39 support the moving racks 25. These beams rest on pitmans 40A and 40B and extend substantially the full length of the furnace at right angles to the racks 24 and 25. The main beams 38 and 39 carry a plurality of cross beams 41, one of which lies beneath the hearth 31 under each movable rack 25. At intervals along the beams 41, pedestals 42 extend upwardly through openings 43 in the hearth and carry, at their upper ends, the movable racks 25. As shown in Figure 4, the upper ends of the pedestals 42 have yokes formed by flanges 43 and 44 in which the racks 25 rest, the racks being held between the flanges 43 and 44 by pins 45. As shown in Figures 2 and 4, cross beams 46 extending between the beams 41 assist in keeping the beams 41 and pedestals 42 in vertical alignment with the openings 43 in the hearth.

Figure 4 also shows the drive for the pitmans 40B. A drive shaft 47, rotating in bearings 48 mounted on pedestals 49, drives an eccentric 50. A sleeve 51 turning on roller bearings 52 about the eccentric 50 carries the pitman 40B. The pitman 40B has an enlarged portion 53 along its upper edge which carries a wrist bearing through which a wrist pin 54 extends. The wrist pin 54 also passes through two legs 55 and 56 of a yoke 57 mounted on the bottom flange of the beam 39. Rotation of the shaft 47 turns the eccentric 50 which, in turn, will cause the sleeve 51 and, therefore, the pitman 40B, to move in a circular motion in a plane parallel to the longitudinal axes of the moving racks 25. This circular motion, together with the configuration of the top surfaces of the racks 24 and 25, moves the tubes across the furnace, as will be later described.

The rotatable connection between the pitmans 40B and the beam 39 just described allows for expansion of the beams due to furnace heat. The pitmans 40A under the beam 38 are driven in the same manner as the pitmans 40B. They differ somewhat in construction, however. The pitmans 40A are not rotatably secured to the beam 38 by a pin 54, but are rigidly secured by plates 52A and 52B (see Figures 2 and 3) which extend upwardly from the sleeve 51 and form a rectangular pocket into which legs of a yoke similar to the yoke 57 (see Figure 4) seat.

If both of the pitmans 40A and 40B were rotatably secured to the beams 38 and 39, the sleeves 51 could turn freely about the eccentrics 50 and the beams would fall. This is prevented by the rigid connection of the pitmans 40A to the beam 38, just described. I reinforce this connection with a plate 52C (see Figure 3) secured to the sleeve 51 and the plates 52A, which plate extends out under the beams 38 and 39 and engages but is not secured to the bottom surface of a cross beam 52D which extends between the beams 38 and 39.

As heretofore mentioned, it is important to the performance of the furnace that the hearth be sealed so as to prevent cold drafts of air from rising up through the hearth. Figures 4 and 5 show the manner in which I seal the openings 43 through which the pedestals 42 extend and at the same time provide a considerable clearance between the edges of the openings 43 and the pedestals 42 for the circular motion of the pedestals. I provide plates 58 directly below the hearth base plate 31a, which plates 58 have openings 61 (see Figure 5) which make a relatively close fit around the pedestals 42. The plates 58 extend across the openings 43 in the hearth and are held up against the base plate 31a by guides 62. The guides 62 allow the plate to move back and forth with the pedestals 42 and at the same time cover the openings 43.

Figure 6 is an enlarged section of a portion of the entry side of a furnace having my conveying apparatus and showing the drive for one of the skewed rollers 20 and also the operating mechanism for the kickups 23. As there shown, each roller 20 is driven by a motor 63 and a right angle gear reducer 64 and shaft 65. The kickups 23 are mounted at one of their ends on a shaft 66 which extends substantially the length of the furnace and on the outside of the furnace. When a tube is to be raised from the rollers 20 and deposited on the stationary racks 24, the shaft 66 is rotated so as to raise the free ends of the kickups 23.

A motor 67 rotates the shaft 66 when required. The motor 67, through a gear reducer 68, turns a crank 69 which, in turn, pulls a lever 70, connected at one of its ends to the crank and at its other end to one end of a lever 71. The other end of the lever 71 is secured to shaft 66. Referring to Figures 7 and 8, it will be seen that, when the crank 69 is turned, the lever 71 is pulled downwardly (viewing Figures 7 and 8) which turns the shaft clockwise and raises the free ends of the kickups 23.

Again referring to Figures 7 and 8, it will be seen that each kickup 23 is a beam which has a short portion 23a which extends downwardly from the shaft 66 and toward the furnace wall. Each kickup then extends generally horizontally, as at 23b, from the short portion 23a through an opening 72 in the furnace wall. The portion 23c of each kickup which is within the furnace is straight and inclines downwardly beneath the tube supporting surfaces of the rollers 20. The portions 23c are curved upwardly at the ends of the kickups to form stops 23d.

Figures 7 and 8 also illustrate the operation of the kickups. When a tube is fed into the furnace through the entrance port 19 on the rollers 20, the kickups are in their lowered position (see Figure 7) and the pipe passes over them until it strikes the bumper 22. The motor 67 is then energized to raise the free ends of the kickups to the position shown in Figure 8. During the motion of the kickups from the down position shown in Figure 7 to the up position shown in Figure 8, the kickups rise up against the pipe 18 and raise it up from the rollers 20. As can be seen from Figure 7, during this lifting motion, the kick-ups roll the pipe 18 up the sides of the rollers 20 and, therefore, the pipe is rotated during this lifting action. As soon as the pipe is free of the rollers 20, it rolls down the portions 23c of the kickups until it strikes the stops 23d at the ends of the kickups. As shown in Figure 8, the tube is then vertically above the ends of the stationary racks 24. Continued rotation of the crank 69 by the motor 67 lowers the free ends of the kickups and they deposit the tube 18 on the ends of the racks 24. The pipe or tube 18 then rolls from the ends of the racks into the first troughs in the racks.

Figure 9:
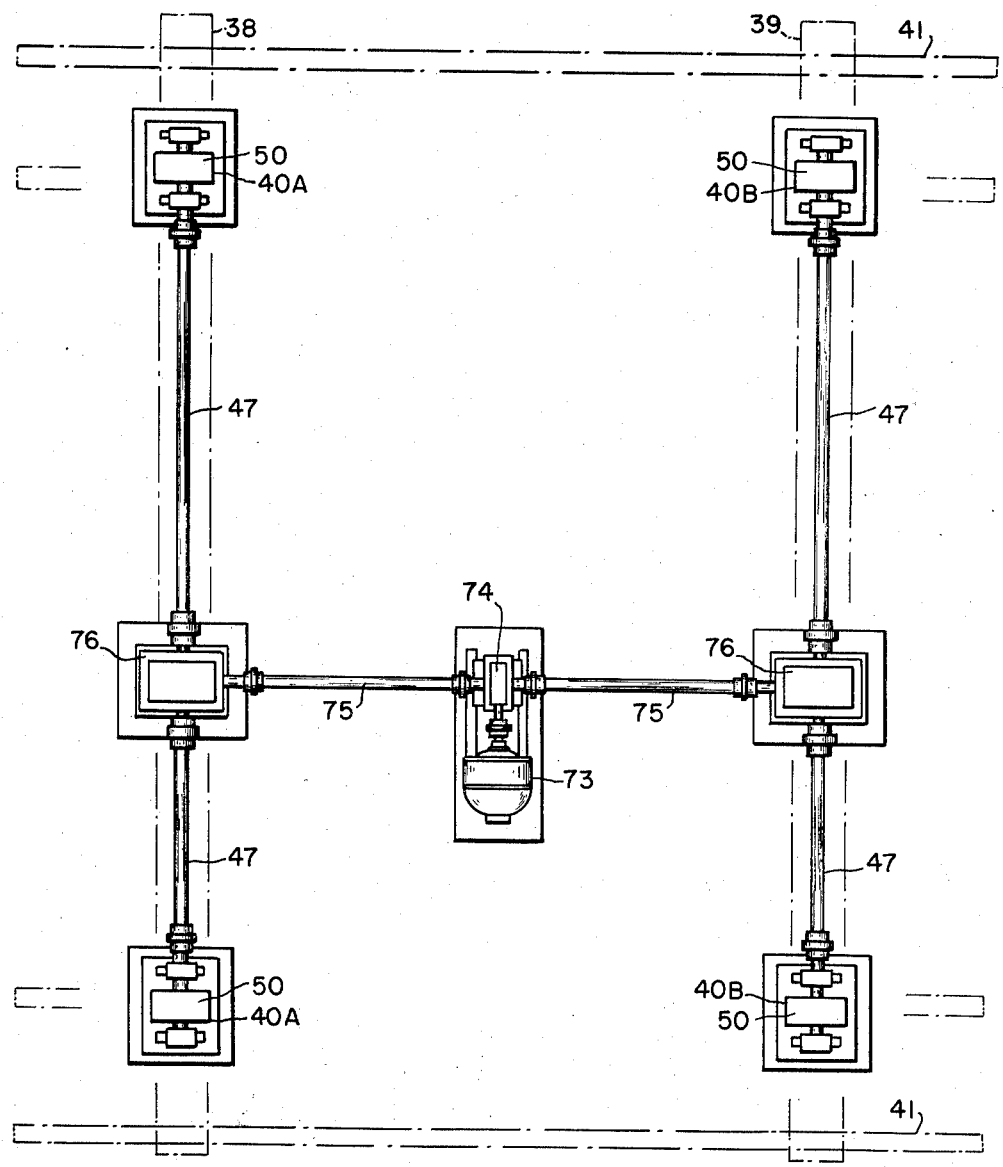
Figure 9 is a plan view of the drive for my conveying apparatus.

The drive for the movable racks 25 is shown in Figure 9. A motor 73, acting through a gear reducer 74 and shafts 75, turns two right angle drives 76 (one for each of the main beams 38 and 39). The right angle drives 76 each drive shafts 47 which, in turn, drive the eccentrics 50, as described with reference to Figure 4.

Figures 10 to 13, inclusive, are schematic diagrams showing the action of the racks 24 and 25 in moving the tubes. In these figures, the stationary racks 24 are shown by solid lines, the movable racks 25 are shown by dotted lines, and the circles in dot and dash lines show the path of travel of the moving racks.

As shown in Figures 10 to 13, inclusive, each of the stationary racks 24 and each of the movable racks 25 have teeth 24a and 25a, respectively, formed along their top surfaces. These teeth support the tubes and, in cooperation with the motion given to the racks 25, cause the tubes to move across the furnace on the racks and, at the same time, they cause each tube to rotate about its axis. As shown in these figures and also in Figure 1, the movable racks 25 are shorter than the stationary racks and the ends of the stationary racks extend beyond both ends of the movable racks and the teeth 25a on the movable racks are positioned approximately halfway between the teeth 24a on the stationary racks.

Figure 10:
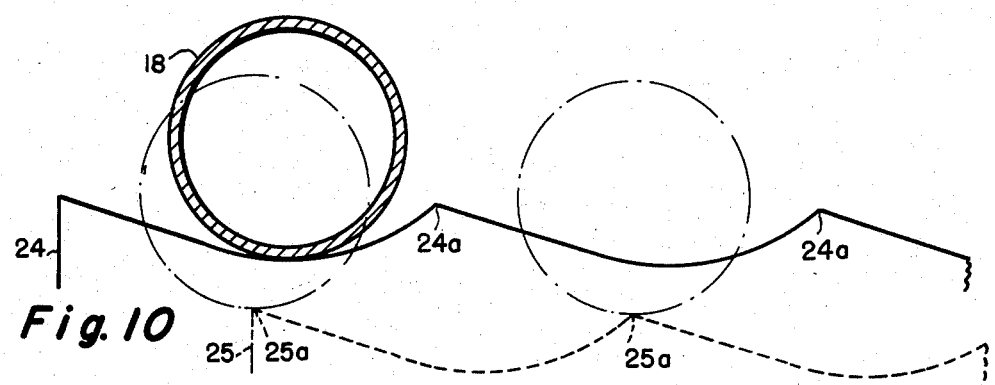
Figure 11:
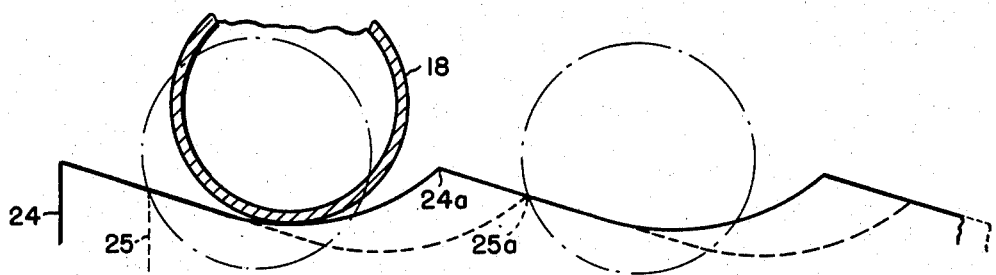
Figure 12:
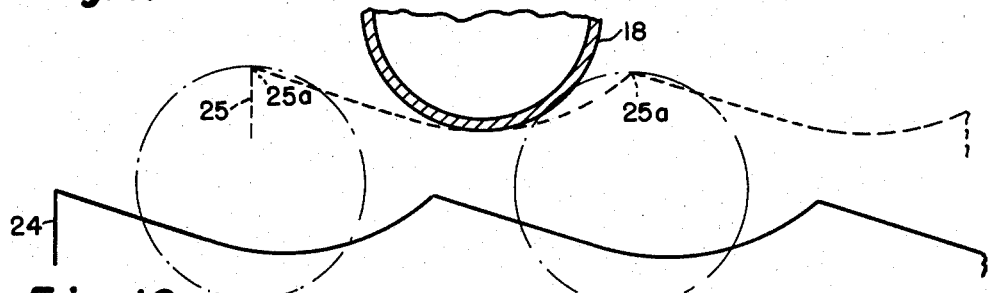
Figure 13:
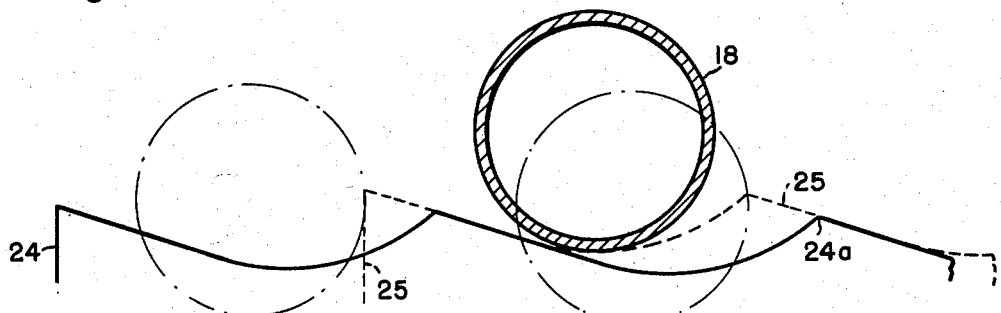

Assuming now that the kickups have deposited a tube 18 on the entry ends of the stationary racks, the drive for the movable racks is started to cause these racks to follow the circular path shown by the dot and dash circles in Figures 10 to 13. Figure 10 shows the lowest position of the racks 25 from which they rise up against the bottom of the tube 18, as shown in Figure 11. As upward motion of the racks 25 continues, the tube rotates and is lifted clear of the stationary racks 24 and the tube continues to roll down the trough between the first two teeth 25a on the moving rack 25. See Figure 12, which shows the top position of the moving racks. From this position, the racks move downwardly and, during this downward movement, the tube 18 is deposited on the stationary racks in the trough between the second and third teeth 24a, as shown in Figure 13.

The movable racks continue downwardly from the position shown in Figure 13, permitting the tube to rotate. When they are lower than the top surfaces of the racks 24, the tube 18 will roll down the troughs between the second and third teeth 24a of the stationary racks 24 to the position shown in Figure 10. At this time, a second tube can be placed in the trough between the first two teeth on the stationary racks, as shown in Figure 10. Continued motion of the moving racks 25 will advance both tubes in the same manner as described above with reference to one tube.

This action continues until each of the troughs between the teeth on the stationary racks supports a tube, whereupon continued operation of the device will place a tube on the exit ends of the racks 25. The exit ends of the racks stop at a point part way between two teeth 25a so that tubes placed on these ends will roll off the ends of the racks onto exit rolls 26 which carry the tubes out through the exit port 28.

As previously stated, the teeth on the moving racks 25 are staggered with respect to the teeth on the stationary racks 24 in the direction of travel of the tubes through the furnace. It should also be noted that the "throw" of the pitmans and, therefore, the extent of the horizontal and vertical movements of the racks is less than the pitch of the teeth on the racks. The amount of staggering of the teeth and the amount of throw are adjusted so as to produce rotation of the tubes about their own axes as they move across the racks.

Generally speaking, a minimum throw of the pitmans is desirable, so far as the horizontal movement of the racks 25 is concerned, since that produces the most rolling of the tubes on the racks and, therefore, the most turning of the tubes about their own axes. There must be, of course, sufficient vertical movement (and, therefore, horizontal movement) of the racks 25 to clear the tops of the teeth on the stationary racks 24. In case such a minimum throw is used, then the teeth on the racks 25 must be staggered relative to the teeth on the stationary racks 24 so that the tubes are lifted from the forward slope of each tooth on the stationary racks and deposited on the rear slopes of these teeth.

Instead of providing a horizontal movement for the movable racks which is less than the pitch of the teeth on the racks, the horizontal movement can be greater than the pitch of the teeth. Such an arrangement, however, has the defect of leaving alternate rows of troughs empty so that only half of the capacity of the furnace is utilized.

It is possible to operate my conveying apparatus by giving the racks 25 a vertical movement only. In this case, the transverse movement of the tubes is obtained only by the rolling of the tubes on the slopes between teeth. It will be noted from Figures 10 to 13, inclusive, that the lowest point of the troughs between teeth is not halfway between two teeth, but is closer to the rear tooth (in the direction of tube travel) of any two teeth forming a trough. When a vertical motion only is given to the movable racks 25, then the lowest points of the troughs between teeth must be close to the rear tooth of any two teeth making up any trough, so that the tubes can roll a substantial part of the distance between two teeth. Also, the teeth on the movable racks must be staggered with respect to the teeth on the stationary racks so that, when the movable racks have raised the tubes clear of the teeth on the stationary racks, the tubes can roll in the troughs of the movable racks from a position above the front slopes to a position above the rear slopes of the teeth on the stationary racks. The pitch of the teeth and the staggering of the teeth will, of course, depend on the diameters of the tubing being passed through the furnace. It will also be noted from Figures 10 to 13 that the troughs are in the form of a smooth curve at and adjacent to the lowest portions of the troughs. As shown in these figures, this portion of the troughs is adapted to engage an arcuate portion of the rounded surface of the workpiece.

While my conveying apparatus can be operated if the movable racks have a vertical movement only and while a small horizontal movement is desirable to produce more rolling of the tubes on the racks, I have found it advisable to give at least some horizontal movement to the movable racks so that, if a cambered tube is fed into the furnace, it will not "hang up" on the teeth of the racks because part of the cambered tube is on one side of a row of teeth and part of the tube is on the other side of the same teeth, so that the tube, in effect, balances on a row of teeth and cannot roll off of the teeth.

Generally speaking, the size of the workpieces to be handled determines the size of the pitch of the teeth on both the movable and stationary racks. Thus, any tube less than 8" in diameter can be carried on racks having a tooth pitch of 8". It should be noted, however, that conveying apparatus of this same size can be used to handle tubes 8" or larger simply by double spacing pipe which is fed to the conveying apparatus. That is, tubes are fed to every other trough between teeth on the racks instead of to every trough. This can readily be done by timing the feed of tubes to the furnace and the operation of the kickups.

The desired speed at which the workpieces rotate about their own axes determines the vertical distance between the bottoms of the troughs between teeth and the apices of the teeth. Generally, it is desirable to have the workpieces rotate slowly about their own axes, but the distance between bottom of trough and top of teeth should not be so small that there is danger of the workpieces "hanging up."

I also provide a variable speed drive for the moving racks 25, and this is important for close metallurgical control of the time and temperature at which the workpieces are heated. Each size of workpiece going through the furnace has to go through the furnace at its own particular speed because each workpiece has its own particular volume and, more particularly, its own thickness which, of course, determines the rate at which heat is uniformly distirbuted through the workpiece.

Instead of moving the racks 25 in a circle or vertically as just described, I may also move racks 25 across the furnace and, at the same time, rotate the tubes about their own axes by moving the racks 25 in a straight line which forms an angle with the horizontal and vertical. Figures 14 to 19 show the operation of my conveying apparatus for moving tubes through the furnace when the movable racks 25 have a straight line motion at an angle of 45 degrees with the horizontal. In these figures, as in Figures 10 to 13, inclusive, the stationary racks 24 are shown by solid lines, the movable racks 25 by dotted lines, and the direction of travel by arrows.

Figure 14:
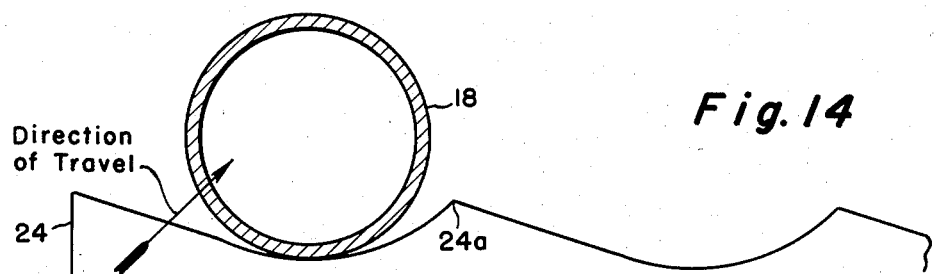
Figure 15:
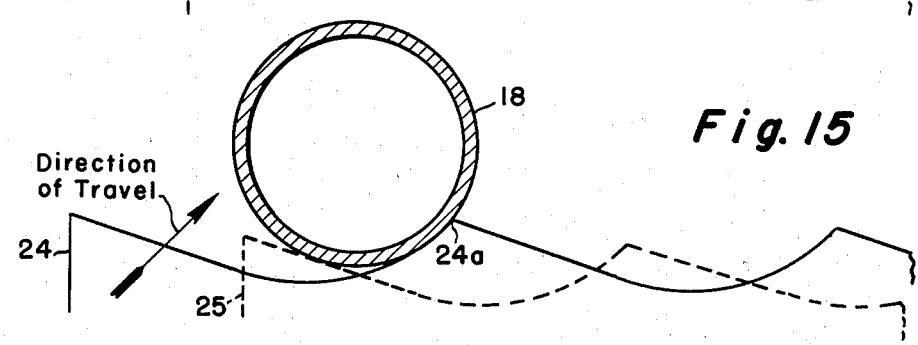
Figure 16:
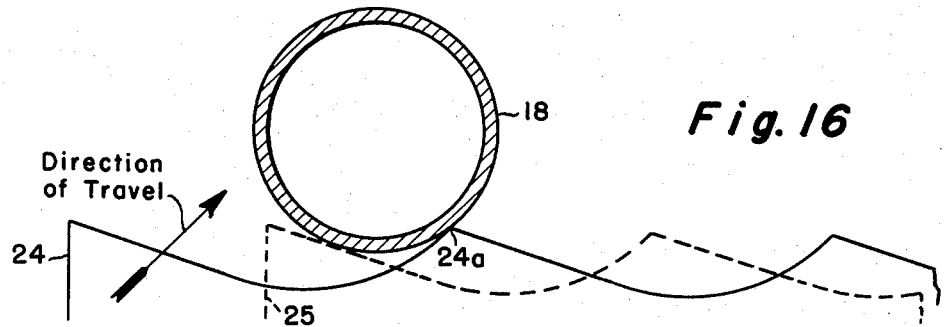
Figure 17:
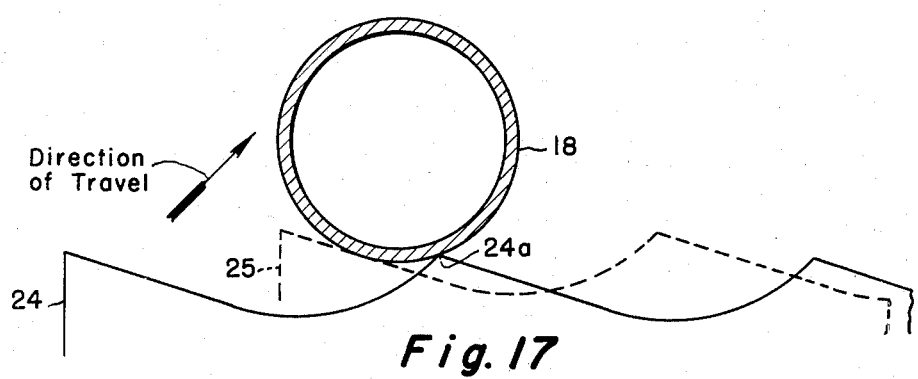
Figure 18:
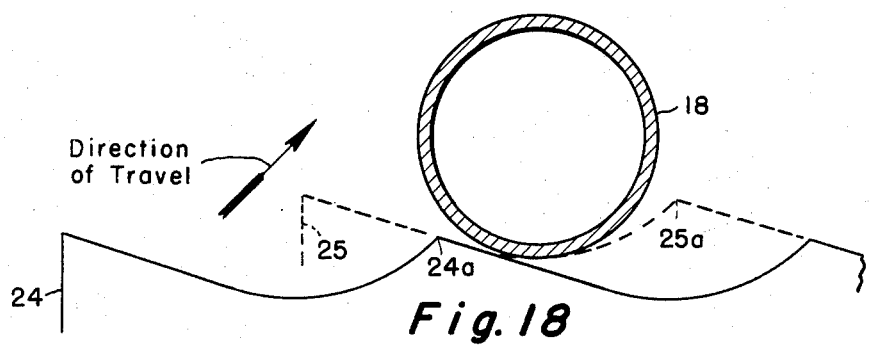
Figure 19:
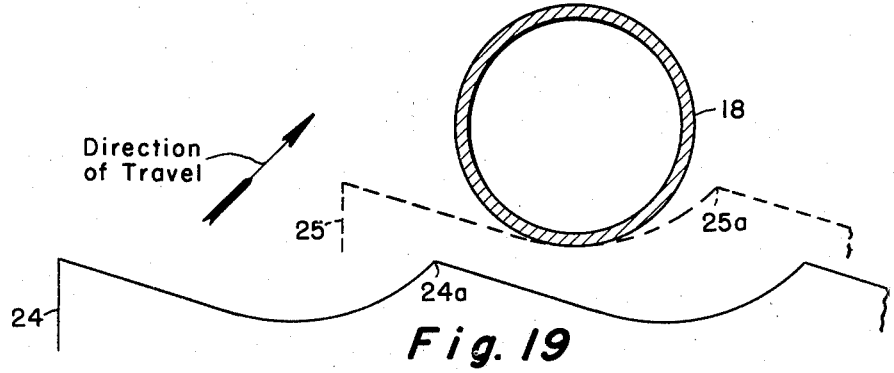

Referring to Figure 14, a tube 18 has been placed on the ends of the stationary racks 24 and the movable racks 25 are shown in their lowest position. From this position, they move upwardly and to the right (viewing Figure 14) in the direction indicated by the arrow until they come against the tube 18, lift it, and cause it to rotate about the teeth 24a on the stationary racks 24, as shown in Figure 15. Continued upward movement of the movable racks causes the tube 18 to continue its tilting about teeth 24a as shown in Figures 16 and 17 until it passes over the teeth 24a as shown in Figure 18. In this position, it is supported between the teeth 24a on the stationary racks and the teeth 25a on the movable racks 25. The movable racks continue their upward movement as shown in Figure 19 so as to be certain to clear the teeth 24a on the stationary racks, the top position of the movable racks being shown in Figure 19. From the position shown in Figure 19, the movable racks move downwardly to the position shown in Figure 14. Comparing Figure 14 with Figure 19, it will be seen that the tube 18 has moved horizontally from a position against the forward slope of the teeth 24a of the stationary racks to a position above the rear slopes of the teeth 24a. When the racks 25 move from the position shown in Figure 19 to the position shown in Figure 18, the tubes are deposited on the rear slopes of the teeth 24a about which they have been tilted and roll down these rear slopes to the position shown in Figure 14, but in the trough behind the trough shown in Figure 14.

Figure 20:
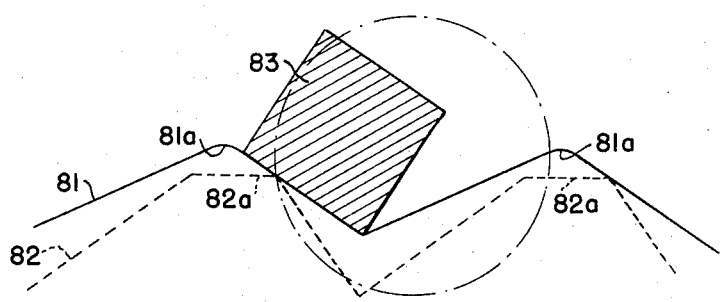

While my invention is primarily intended for conveying round sections, such as tubes, rods, etc., through a furnace, my invention can also be used to move other workpieces having other cross-sectional shapes, such as squares, rectangles, etc. If square or rectangular sections are to be carried on a conveying table embodying my inventions, it is necessary, however, to change the shape of the teeth so as to increase the slope of the sides forming the troughs between adjacent teeth in order to rotate workpieces having such rectangular or square cross-sectional shapes about their longitudinal axes. A conveying table suitable for conveying squares and rectangles through the furnace is shown schematically in Figures 20 to 25, in which the contours of the stationary racks 81 are shown in solid lines, the contours of the movable racks 82 are shown in dotted lines, and the paths of travel of the movable racks are shown as circles in dot and dash lines. Referring to Figure 20, it will be seen that the slopes of the teeth 81a of the stationary racks and the teeth 82a of the movable racks are much steeper than the slopes of the teeth on the racks used for moving circular workpieces, such as tubes. The increased slope is required to handle the rectangular and square workpieces. It will also be noted from Figure 20 that the teeth of the movable racks are cut off adjacent their apices. This is done to provide a sharp slope to the teeth without unnecessarily increasing the height of the teeth.

Figure 21:
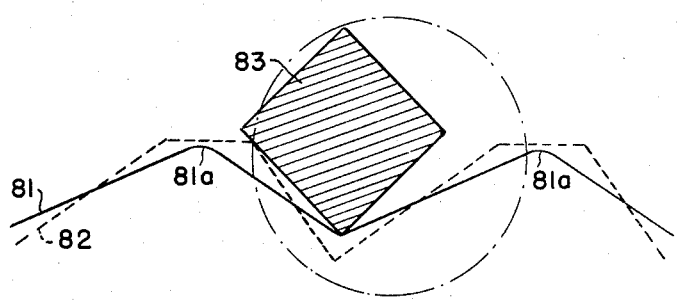
Figure 22:
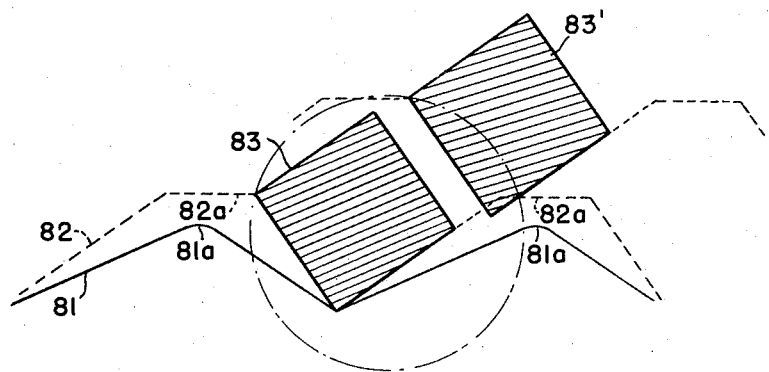

In Figure 20, a square billet 83 is shown in a trough between two teeth 81a on the stationary racks and the movable racks are shown in their lowest position. When the racks 82 are moved, they rise up against the side of the billet which rests on the stationary rack and tilt it about its lower corner which rests at the bottom of the trough between two teeth of the stationary racks, as shown in Figure 21. The movable racks continue in a circular path clockwise and, in so doing, lift the billet 83 off the stationary racks 81. The billet in this position is indicated in Figure 22 as 83'. Continued rotation of the movable racks from the position of the billet at 83' in Figure 22 lowers the billet so that its lower rear corner comes down on the teeth 81a of the stationary racks, which are the rear teeth of the two teeth on each rack forming the troughs from which the billet was lifted.

The movable racks continue downwardly in a circular motion and, during this part of their motion, the corner of the billet resting on the teeth 81a remains on these teeth. The billet 83 thus rotates about the teeth 81a using the lowermost corner as a pivot. The successive positions of the billet are shown in Figure 23 as 83—1, 83—2, 83—3, and 83—4, respectively, and the several positions of the movable racks which correspond to these positions of the billet are shown as 82—1, 82—2, 82—3, and 82—4, respectively.

Figure 23:
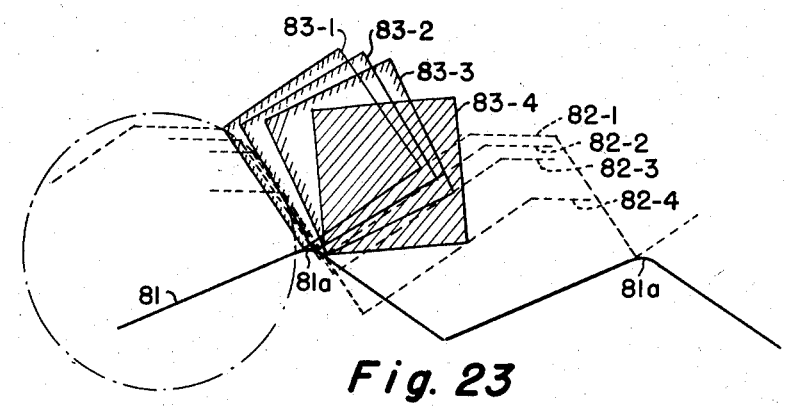
Figure 24:
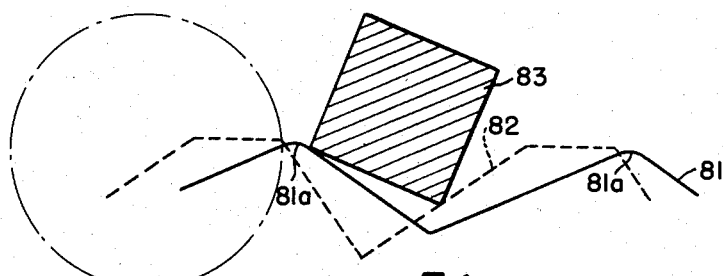
Figure 25:
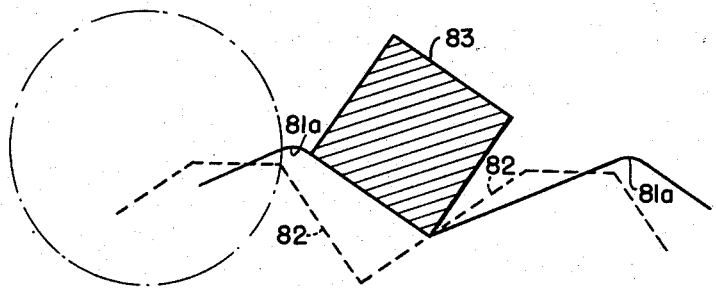

From the position 82—4 of Figure 23, the movable racks continue to move downwardly and rearwardly (relative to the transverse motion of the billet through the furnace) and the billet continues to turn, as shown in Figure 24, until the entire side of the billet rests on the rear slopes of the teeth 81a of the stationary racks about which the billet pivoted and in the troughs immediately back of those in which the billet rested at the start of the motion of the movable racks. This position is shown in Figure 25. Comparing Figure 25 with Figure 20, it will be seen that the billet is in the same relative position in successive troughs.

As a precautionary measure, I provide a guide for preventing the movable racks 24 from moving from side to side in the furnace; that is, from moving back and forth in a direction parallel to the length of the tubes as they move through the furnace. This structure is shown in Figure 2. Two plates 77 and 78 rise vertically from pedestals 79 and extend across the furnace, i. e., in a direction parallel to the racks 24 and 25. The plates 77 and 78 form a trough in which a cross beam 80 extending between the two main beams 38 and 39 slides, as shown in Figure 2. The beam 80 is secured to the bottom flanges of the beams 38 and 39 and thereby restricts longitudinal movement of these beams. This, in turn, restricts sidewise motion of the movable beams 25 and the pedestals which support them.

My furnace conveying apparatus produces metallurgical results which have not heretofore been possible to obtain in continuous heat-treating furnaces. Because the workpieces are rotated about their own axes as they progress through a furnace, the pieces are uniformly heated throughout. Physical defects in the workpieces, such as warpage, are thereby avoided, as well as metallurgical defects, such as cold spots. Moreover, by reason of the construction of my conveying apparatus, I am able to effectively seal the hearth of the furnace, which prevents cold drafts from rising up from the hearth into the heating zone proper. Much closer control of heating temperatures is, therefore, possible and cold spots are avoided.

My furnace conveying apparatus provides such close control of heating treatments that tubes can be made from carbon steels with physical properties heretofore obtained only in tubes made from high alloy steels. My conveying apparatus thus saves many tons annually of strategic alloys, such as manganese, molybdenum, and chromium, which were heretofore used in steels for high strength seamless pipe used in deep well drilling.

While I have described certain present preferred embodiments of my inventions, it is to be understood that they may be otherwise embodied within the scope of the appended claims.

I claim:

1. A device for lifting and moving round workpieces, such as pipes, bars, billets, and the like, sidewise from one fixed position to a second fixed position comprising a beam mounted on a fixed pivot and rotatable about said pivot and having a portion adapted to extend from the point of rotation beneath and beyond the workpiece when it is in both fixed positions, means for rotating the beam about its pivot point, said extending portion having a surface adapted to engage and lift a workpiece when it is in the first fixed position upon rotation of the beam in one direction, said surface sloping downwardly to a point adjacent the second fixed position when it engages the workpiece in the first position whereby on continued rotation of the beam in the same direction the workpiece may roll on said surface to a point above the second fixed position and upon reverse rotation of the beam will be deposited in said second fixed position.

2. Apparatus for conveying round workpieces to be heated, such as pipes, bars, billets, and the like, through a furnace, comprising two series of racks extending parallel to but spaced from each other across the furnace and in the direction of movement of the workpieces through the furnace, at least one of said series of racks being movable vertically relative to the other series, a plurality of like teeth along the workpiece supporting surfaces of both series of racks, the surfaces of the racks between teeth being in the form of troughs with the lowest portion of the trough being spaced from the second tooth (in the direction of workpiece travel) of any two teeth forming a trough but closer to the second tooth than to the first tooth, said surfaces also having the shape of a smooth curve at and adjacent to said lowest portion of the trough adapted to engage an arcuate portion of the rounded surface of the workpiece, the teeth in one series of racks being offset in the line of movement of the workpieces with respect to the teeth in the other series, and means for moving at least one of said series of racks relative to the other series whereby workpieces are moved alternately from one series to the other through the furnace.

3. Apparatus for conveying round workpieces to be heated, such as pipes, bars, billets, and the like, through a furnace, comprising two series of racks extending parallel to but spaced from each other across the furnace and in the direction of movement of the workpieces through the furnace, at least one of said series of racks being movable horizontally and vertically relative to the other series, a plurality of like teeth along the workpiece supporting surfaces of both series of racks, the surfaces of the racks between teeth being in the form of troughs with the lowest portion of the trough being spaced from the second tooth (in the direction of workpiece travel) of any two teeth forming a trough but closer to the second tooth than to the first tooth, said surfaces also having the shape of a smooth curve at and adjacent to said lowest portion of the trough adapted to engage an arcuate portion of the rounded surface of the workpiece, the teeth in one series of racks being offset in the line of movement of the workpieces with respect to the teeth in the other series, and means for moving at least one of said series of racks relative to the other series, both horizontally and vertically, the amount of horizontal movement being less than the pitch of the teeth on the racks, whereby workpieces are moved alternately from one series to the other through the furnace.

4. Apparatus for conveying workpieces to be heated, such as pipes, bars, billets, and the like, through a furnace, comprising two series of racks extending parallel to but spaced from each other across the furnace and in the direction of movement of the workpieces through the furnace, at least one of said series of racks being movable vertically relative to the other series, a plurality of teeth along the workpiece supporting surfaces of both series of racks, the surfaces of the racks between teeth being in the form of troughs with the lowest portion of the trough being spaced from the second tooth (in the direction of workpiece travel) of any two teeth forming a trough but closer to the second tooth than to the first tooth, the teeth in one series of racks being offset in the line of movement of the workpieces with respect to the teeth in the other series an amount such that the lowest portions of the trough of the series of racks in which the workpieces are momentarily resting are spaced backwardly (in the path of travel of the workpieces) from the lowest portions of the trough of the second series of racks at the moment when the troughs of said second series also engage the workpieces, and means for moving at least one of said series of racks relative to the other series whereby workpieces are moved alternately from one series to the other through the furnace.

5. Apparatus for conveying round workpieces to be heated, such as pipes, bars, billets, and the like, through a furnace, comprising two series of racks extending parallel to but spaced from each other across the furnace and in the direction of movement of the workpieces through the furnace, one of said series of racks being vertically movable and the oher series being stationary, a plurality of like teeth along the workpiece supporting surfaces of both series of racks, the surfaces of the racks between teeth being in the form of troughs with the lowest portion of the trough being spaced from the second tooth (in the direction of workpiece travel) of any two teeth forming a trough but closer to the second tooth than to the first tooth, said surfaces also having the shape of a smooth curve at and adjacent to said lowest portion of the trough adapted to engage an arcuate portion of the rounded surface of the workpiece, the teeth in one series of racks being offset in the line of movement of the workpieces with respect to the teeth in the other series, and means for moving the movable series of racks vertically with respect to the stationary racks whereby workpieces are moved alternately from one series of racks to the other through the furnace.

6. Apparatus for conveying workpieces to be heated, such as pipes, bars, billets, and the like, through a furnace, comprising two series of racks extending parallel to but spaced from each other across the furnace and in the direction of movement of the workpieces through the furnace, at least one of said series of racks being movable horizontally and vertically relative to the other series, a plurality of teeth along the workpiece supporting surfaces of both series of racks, the surfaces of the racks between teeth being in the form of troughs with the lowest portion of the trough being spaced from the second tooth (in the direction of workpiece travel) of any two teeth forming a trough but closer to the second tooth than to the first tooth, the teeth in one series of racks being offset in the line of movement of the workpieces with respect to the teeth in the other series, the amount of horizontal movement of one series of racks relative to the other series and the amount of said offset being such that the lowest portions of the troughs of the series of racks in which the workpieces are momentarily resting are spaced backwardly (in the path of travel of the workpieces) from the lowest portions of the troughs of the second series of racks at the moment when the troughs of said second series also engage the workpieces, and means for moving at least one of said series of racks relative to the other series whereby workpieces are moved alternately from one series to the other through the furnace.

7. Apparatus for conveying workpieces to be heated, such as pipes, bars, billets, and the like, through a furnace having a hearth extending the full length of the furnace, comprising two series of racks extending parallel to but spaced from each other across the furnace and in the direction of movement of the workpieces through the furnace, a plurality of teeth along the workpiece supporting surfaces of both series of racks, at least one series of racks being movable vertically relative to the other series to transfer the workpieces alternately from one series of racks to the other, the movable racks being supported by pedestals extending through openings in the hearth, a beam extending parallel to each movable rack and beneath the hearth for supporting the pedestals, additional beams extending beneath the beams on which the pedestals stand and at right angles thereto to support said pedestal beams, pitmans supporting said additional beams, eccentrics for driving the pitmans, a common drive for the eccentrics, tie beams connecting said additional beams to each other, and means at one end of each tie beam for maintaining a fixed angularity between the tie beam and the adjacent pitman.

8. A method of continuously heating workpieces, such as tubes, bars, billets, and the like, comprising introducing the workpieces axially into a furnace adjacent and generally parallel to one side of the furnace, rotating the workpieces about their axes while introducing them into the furnace, moving the workpieces across the furnace in a direction substantially at right angles to their axes in increments of the width of the furnace by supporting them alternately in two series of racks extending parallel to the direction of movement of the workpieces across the furnace and rotating the workpieces about their axes in the direction of movement of the workpieces through the furnace at the beginning and end of each increment of movement, and stopping said rotation at an intermediate portion of each increment of movement, and withdrawing the workpieces axially from the furnace in a path of movement parallel to and adjacent the side of the furnace opposite to the entry side and rotating the workpieces while withdrawing them from the furnace.

9. A method of continuously heating workpieces as described in claim 8, in which the workpieces are introduced into the furnace one at a time and withdrawn from the furnace one at a time.

10. A device for lifting and moving round workpieces, such as pipes, bars, billets, and the like, sidewise from one fixed position to a second fixed position comprising skewed and notched rollers for supporting the workpieces in the first position, racks extending transversely to the workpieces and having troughs formed in their upper surfaces for supporting the workpieces in the second position, a beam mounted on a fixed pivot and rotatable about said pivot and having a portion adapted to extend from the point of rotation beneath and beyond the workpiece when it is in both fixed positions, means for rotating the beam about its pivot point, said extending portion having a surface adapted to engage and lift a workpiece when it is in the first fixed position upon rotation of the beam in one direction, said lifting action rolling the workpiece up the inclined surfaces of the skewed and notched rollers, said surface sloping downwardly to a point adjacent the second fixed position when it engages the workpiece in the first position whereby on continued rotation of the beam in the same direction the workpiece may roll on said surface to a point above the second fixed position and upon reverse rotation of the beam will be deposited on said racks in a position to roll into said troughs.

References Cited in the file of this patent

UNITED STATES PATENTS

| | | |
|---|---|---|
| 1,400,367 | McCann | Dec. 13, 1921 |
| 1,824,439 | McKee | Sept. 22, 1931 |
| 1,882,470 | Assel | Oct. 11, 1932 |
| 1,897,911 | McCann | Feb. 14, 1933 |
| 1,937,395 | Thorne | Nov. 28, 1933 |
| 1,965,868 | Vickers | July 10, 1934 |
| 2,296,806 | Buckholdt | Sept. 22, 1942 |
| 2,542,878 | Ottinger et al. | Feb. 20, 1951 |

FOREIGN PATENTS

| | | |
|---|---|---|
| 303,830 | Great Britain | 1929 |
| 313,819 | Germany | June 28, 1919 |